Patented Dec. 2, 1924.

1,517,819

UNITED STATES PATENT OFFICE.

HANS BEER, OF RATIBOR, UPPER SILESIA, GERMANY, ASSIGNOR TO RUTGERSWERKE AKTIENGESELLSCHAFT, ABTEILUNG PLANIAWERKE, OF BERLIN, GERMANY.

METHOD OF PRODUCING CARBON ELECTRODES AND THE PRODUCT THEREOF.

No Drawing.  Application filed April 17, 1924.  Serial No. 707,318.

*To all whom it may concern:*

Be it known that I, Dr. HANS BEER, a citizen of the United States of America, residing at 7-10 Fabrikstrasse, Ratibor, Upper Silesia, Germany, have invented a certain new and useful Method of Producing Carbon Electrodes and the Product Thereof, of which the following is a specification.

The raw materials that are principally used for example for producing carbon electrodes for electro-thermal and electro-chemical processes, are anthracite, carbon produced from liquid hydro-carbons, pitch carbon and retort graphite. These materials are usually ground down to a particular size of grain, then mixed with tar and pitch as binder, and finally moulded in the particular sizes required by pressure.

The most important of the raw materials indicated is anthracite, but the purpose for which it can be used in special fields of work is limited by its relatively high ash content. For this reason the use of English anthracite is still preferred, as it contains only from 3 to 4 per cent of ash, whereas German anthracites have an ash content of from 8 to 10 per cent and even more. The ash of the raw materials appears as slag in the thermal process, and it prejudicially affects the working of the process.

Recently success has been attained by the so-called separation by flotation in the very considerable reduction of the ash content in anthracite coal. Thus, for instance, it has been possible to purify anthracite which hitherto had an ash content of 12.72%, to 1.6%, and there are no technical difficulties involved in carrying the process of purification still further, so that the ash content of such a purified anthracite sludge would be less than 1%. This process, however, has the great disadvantage that it cannot be carried out except with a finely-powdered material, and that furthermore the results of the treatment improve with the greater the degree of fineness of the material treated. This finely divided material, even in its purified condition, is quite unsuitable for the manufacture of carbon electrodes, because in burning, such electrodes develop fissures and cracks by reason of the great shrinkage, just as with other ceramic bodies, and consequently they are thus rendered useless. For these reasons the grains of the main part of the anthracite used in the manufacture of electrodes now vary from 3 to 15 mm. The objection above explained is at once avoided according to the present invention if the purified finely divided anthracite is compressed to form briquettes (tar or pitch or a mixture of both being used as binder), and then carbonized, the product being used as raw material instead of anthracite in the condition of coarse particles.

Hitherto it has been necessary to subject mined or raw anthracite to a high temperature to render it incandescent for such time as to expel the volatile constitutents. Only after such application of heat does the anthracite become constant in volume and thus suitable for the manufacture of electrodes.

One advantage of the process according to the present invention, not at once apparent is that the anthracite purified by the process of separation by flotation no longer requires to be specially heated to incandescence in calcining furnaces as has hitherto been the custom with ordinary anthracite, and that furthermore when the compressed briquettes from the purified and finely divided anthracite are heated to incandescence as in the known manner, considerable quantities of a valuable gas are driven off. The volatile constituents released by the heating of the briquettes to incandescence, consist on the one hand of the gases still contained in the anthracite, and on the other hand of the products of decomposition resulting from the carbonization of the binder. This gas has approximately the same value as illuminating coal gas. Thus the extraction of the gas in the present method of production represents an advance in the art.

The carbonized briquettes present a refractory material that is effectively consolidated, and which can be readily ground down to any desired size of grain without crumbling to powder, and which furthermore possesses a hardness and compactness at least equal to that of the best English anthracite.

By this means it is possible to use as material for the manufacture of such electrodes, a substance that has hitherto been practically worthless and of a quality comparable to that which it has not been possible to secure as raw or mined material except in particular localities. It is possible to take a step further and use as raw material for separation by flotation the anthracite sludge which settles in the tanks in which the anthracite is washed, this sludge being reduced to a uniform condition of fineness or the coarse particles separated therefrom.

Anthracite has been mentioned as the most important raw material merely by way of an example. Other carbonaceous raw materials such as usually employed in the manufacture of electrodes may be prepared in a manner similar to that hereinbefore described.

I claim:

1. A process for producing carbon electrodes from raw materials having a low ash content and purified by the flotation method of separation, characterized in that the powdered raw material so purified is compressed into briquettes with suitable binders and then subjected to heat to effect carbonization and compactness, the briquettes being then ground down to the desired size of grain and used in known manner for producing electrodes.

2. A method of carrying out the process according to claim 1, characterized in that the raw material used is mined anthracite which has been purified by the flotation method of separation.

3. A method of carrying out the process according to claim 1, characterized in that the raw material used for treatment by the flotation method of separation is anthracite sludge which settles in the tanks in which the coal is washed.

4. A method of preparing carbonaceous material to render it into a condition suitable for use in the manufacture of carbon electrodes, consisting in the following steps: the reduction of the raw material into a relatively fine state of division, the separation of substantially the whole of its ash content, the consolidation of the carbonaceous material thus treated, and the comminution of the consolidated masses thus produced into particles that are relatively coarse.

5. A method of preparing carbonaceous material to render it into a condition suitable for use in the manufacture of carbon electrodes, consisting in the following steps: the reduction of the raw material into a relatively fine state of division, the separation of substantially the whole of its ash content, the consolidation of the carbonaceous material thus treated, the carbonization of the product, and the comminution of the consolidated masses thus produced into particles that are relatively coarse.

6. A product of manufacture being a carbonaceous substance, substantially free from ash content, in relatively coarse grains, each of the said grains being constituted of a number of fine particles consolidated under pressure.

7. A product of manufacture being a degasified carbonaceous substance, substantially free from ash content, in relatively coarse grains, each of the said grains being constituted of a number of fine particles consolidated under pressure.

Dr. HANS BEER.

Witnesses:
F. HEROLD,
C. LANGE.